Oct. 2, 1934. J. W. ANDERSON Re. 19,331

GOVERNOR

Original Filed March 26, 1921

Inventor
James W. Anderson

By Whittemore Hulbert Whittemore
& Belknap Attorneys

Reissued Oct. 2, 1934

Re. 19,331

UNITED STATES PATENT OFFICE 19,331

GOVERNOR

James W. Anderson, Detroit, Mich., assignor to Monarch Governor Company, Detroit, Mich., a corporation of Michigan Original No. 1,662,098, dated March 13, 1928, Serial No. 455,765, March 26, 1921. Application for reissue March 7, 1930, Serial No. 434,151

10 Claims. (Cl. 137—152)

The invention relates to governors designed for use in connection with fluid-operated motors to limit the maximum speed under varying condition of load and power output, and more particularly of that type in which the throttle is automatically adjusted by the actuation of a member located in the engine intake. Usually the member for thus actuating the throttle is in the form of a disk connected to the throttle by a suitable linkage and operating in a tapering portion of the intake passage. This disk forms an obstruction to the free flow of the intake gases, and therefore the inevitable result is the cutting down of the power of the engine.

It is the object of the present invention to obtain a construction which will govern without material reduction in the maximum power of the engine, and further, to obtain a simplified construction. The invention therefore consists in various features as hereinafter set forth.

Figure 4:
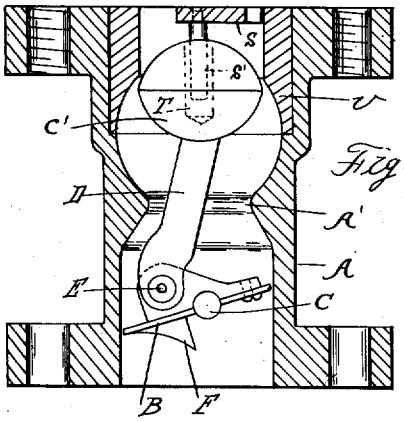
Figure 4 is a view similar to Figure 1 showing a different position of adjustment.
Figure 2:
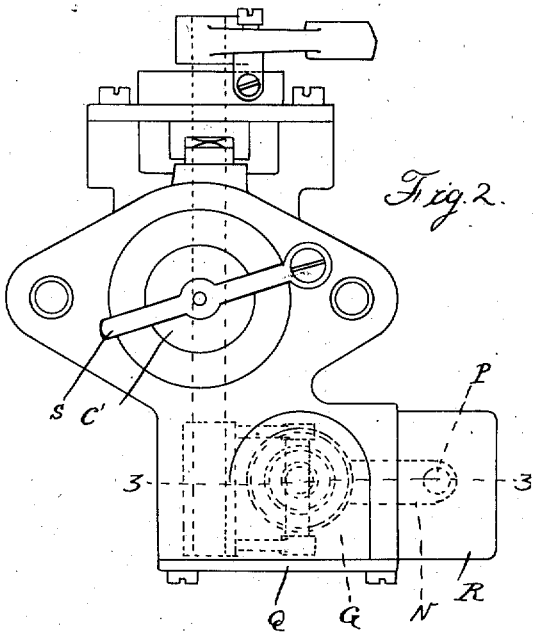
Figure 2 is a plan view thereof.

A is a casing forming a part of the engine intake and having arranged therein the throttle valve B mounted upon the shaft C. Usually the throttle is of a balanced butterfly type, but it is one of the features of my improvement to employ an unbalanced construction with a tendency to be closed by the flow of the gases. By "unbalanced valve" as used throughout the specification and claims, I mean a pivoted valve having the major portion of its area at one side of the pivot. Thus variations in the speed of the engine will vary the differential force directly acting upon the throttle to close the same, but it is desirable to supplement this force particularly where the throttle is near its wide open position. I have therefore provided an auxiliary actuating member C′ having a link D pivotally attached at E to the throttle. The member C′ is of a spheroidal or substantially stream-lined form so as to offer less resistance to the passage of the gases than a flat disk, and the casing A is so fashioned as to form about the member C′ in the open position of the throttle an annular passage of substantially constant cross-sectional area, while between said member and the throttle the passage has a constricted throat A′ of substantially Venturi form. Thus when the throttle valve is in wide open position, there is very little resistance to the passage of the gases through the casing and about the member C′, but nevertheless the convergence of the gases produced by the constricted throat A′ will cause them to impinge against the spheroidal member C′ and increase the pressure tending to close the valve. To still further assist in the movement of the throttle, an inclined vane F is placed thereon and is so arranged as to augment the unbalanced pressure operating on the valve when in open position. The combined effect of the eccentric axis of the throttle, the member C′ and the vane F is to furnish the necessary actuating force for changing the position of the throttle under varying conditions of load upon the engine.

The throttle is opened by a counteracting force, which is of such a character as to counterbalance the combined forces tending to close the throttle in each position of adjustment thereof for varying power output. The characteristic of the necessary counteracting force is not that of a simple spring, but can be produced by a compound spring in the manner set forth in the patent to Pierce 1,461,933, issued July 17, 1923. I therefore make use of such a compound spring, which is preferably located within a closed chamber G integrally formed with the casing A. As shown, H are rock arms mounted on the shaft C of the throttle valve, and I are links pivotally attached to said arms and embracing a series of concentric springs J, J′ and $J^2$. All of these springs are adapted to bear at one end against a collar K pivotally attached to the outer ends of the links I, while the opposite ends of the springs bear against an abutment L. The springs are, however, of different lengths and the abutment L is stepped, as indicated at L′ and $L^2$, so as to furnish a predetermined clearance between the free lengths of the springs and the collar K. Thus when the compound spring is compressed, the outer spring $J^2$ alone is first in action, while the other springs are successively thrown into action until all are simultaneously operated.

To facilitate the original setting of the governor, the abutment L is adjustable and as shown it is slidably mounted on a wall M of the casing with a lug N projecting through a slot O in said wall. A screw P has a threaded engagement with the lug N and is used for adjusting the same to vary the position of the abutment. The spring is preferably enclosed in a housing upon the casing A, which is closed by a cover plate Q and the adjusting screw P is also preferably enclosed in a detachable housing R, which is normally locked from detachment by suitable means such as the padlock R'.

With the construction as thus far described, when the governor is properly adjusted, it will automatically assume positions for maintaining substantially constant speed under varying conditions of load. Thus if the engine is idling or without load, the tendency to race is checked by the closing of the throttle under the actuation of the gaseous current against the unbalanced areas and also upon the spheroidal member C', which latter assumes a position where it constricts the area of the surrounding gas passage, as indicated in Figure 4. If a load is thrown upon the engine, the first effect is to check the speed and the velocity of gases through the intake, which will permit the spring to open the throttle. The throttle will not, however, be opened wide, but only to a position where the forces due to the velocity of the gaseous current counterbalance the force of the spring and the characteristic of the spring is such that in each position of the throttle, corresponding to a predetermined load on the engine, the spring in such position will counterbalance the gaseous forces operating upon the throttle when the engine is running at substantially predetermined speed.

The spheroidal member C' will automatically assume the center of the gaseous current passing through the intake and will hold this position without other guiding means, so that there is no friction element to retard its free movement. When, however, the engine is at rest, the member C' would fall against the side of the casing and to avoid such a defect, I have provided a central guide S' attached to an arm S projecting inward from the casing and engaging a central bore T in the spheroidal member C'. This guide S will thus hold the member C' at all times substantially centrally, but whenever the governor is operating, it will be held free from engagement with this guide by the centering action of the gaseous current.

To reduce the resistance of the passage of the gases to the minimum, the inner contour of the casing A is accurately fashioned. This is facilitated by the use of one or more bushings U, which are externally of cylindrical shape fitting a cylindrical bore in the casing A and are internally fashioned to the desired contour.

Figure 1:
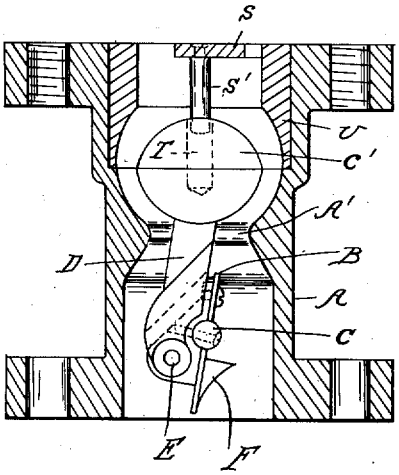
Figure 1 is a longitudinal section through the governor.

As shown in Figure 1, when the throttle is in open position, the spheroidal member C' will be at the center of the surrounding spheroidal casing and will produce in effect a Venturi passage offering very little resistance to the flow of gases. On the other hand, when the throttle is nearly closed, as shown in Figure 4, the spheroidal member moves upward into closer proximity to the surrounding wall, so as to restrict the passage. The effect is to increase the rapidity of the throttle adjustment when the load on the engine is varied, both when moving towards closed position and towards open position.

The vane F only comes into action when the throttle is near its wide open position, in which position the angle of the vane is such as to increase the force tending to close the throttle. As soon as the throttle is partly closed, the vane is covered by the area of the throttle itself, and consequently, does not materially alter the forces which would act upon the throttle itself.

In constructing the compound spring, it is necessary to first obtain accurate data to determine the characteristic desired and then to construct the spring so as to give such a characteristic. The method by which this result is obtained is not, however, a part of the present invention and therefore will not be described.

Figure 3:
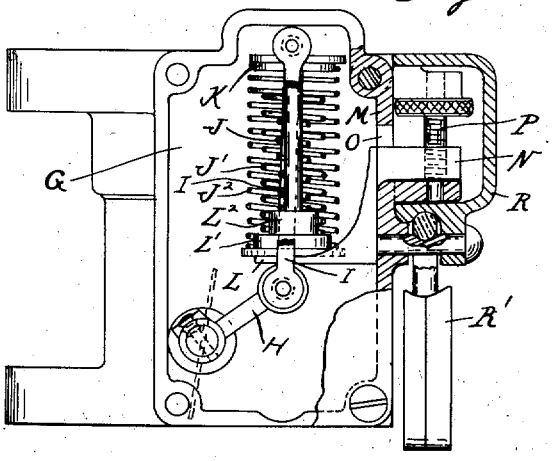
Figure 3 is a section on line 3—3 of Figure 2.
Figure 5:
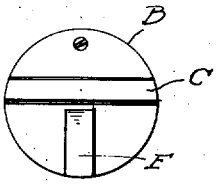
Figure 5 is a plan view of the throttle.

It will be noted that the vacuum responsive valve member C, which in the present embodiment is mounted in the intake passage, is actuated by the differential in pressure occurring in the intake duct at the engine side of the throttle valve B. Therefore, the effect of an increase in suction on the valve member C' is to move it into closing position thereby shifting the valve B toward closing position. This movement of the vacuum member is opposed or counteracted by the compound spring J, J' and $J^2$, and during this closing movement the arm H (see Figure 3) swings downwardly on an arc and acts through the links I and abutment K to deflect the spring. Since the vacuum responsive member C' moves on a straight line toward closing position, whereas the link H swings downwardly in a curved path during such movement, it will be readily seen that the spring will be deflected at a continuously increasing rate as compared with the movement of the vacuum responsive member C' toward closing position. This rate of increase for the deflection of the spring is varied or adjusted by the adjusting screw P.

I claim:

1. In a governor for internal combustion engines, the combination with a casing forming a portion of the engine intake, of a throttle valve in said casing having an eccentric axis to form an unbalanced construction, a stream lined member within said casing operatively connected to said throttle and actuated by the fluid current passing through said casing to close said valve, a plurality of springs forming a counteracting force upon said valve, and means for limiting the action of said springs to produce a characteristic substantially corresponding to the forces tending to close the throttle under constant speed conditions.

2. In a governor for internal combustion engines, the combination with a casing forming a portion of the engine intake, of a butterfly throttle valve therein having an eccentric axis to produce an unbalanced condition whereby the passage of the fluid current tends to close said valve, a vane projecting from said throttle at an angle thereto for augmenting the force tending to close said valve when in its full open position, and means for applying a counteracting force for opening said valve.

3. A governor for internal combustion engines including an unbalanced governing valve, and vacuum responsive means for moving said governing valve toward its closed position.

4. In a governor for an internal combustion engine, the combination of a butterfly valve in the intake passage having an eccentric axis to produce an unbalanced condition whereby the passage of the fluid current tends to close said valve, and means subject to vacuum in the intake passage at the engine side of said valve for augmenting the force tending to close said valve.

5. In a governor for an internal combustion engine, the combination of an unbalanced governing valve in the intake passage, and vacuum responsive means mounted in said passage at the engine side of the valve for exerting force on said valve to close the same.

6. A governor for internal combustion engines including a governing valve eccentrically pivoted whereby the major portion of its area is at one side of the pivot and actuated in a closing direction by the flow of fluid thereover, and vacuum responsive means for augmenting the movement of said valve towards closed position.

7. A governor for internal combustion engines including an unbalanced governing butterfly valve actuated in a closing direction by the flow of fluid thereover, and vacuum responsive means for augmenting the movement of said valve towards closed position and subject to pressure existing in the intake manifold.

8. A governor for internal combustion engines including in combination, a governor casing, an unbalanced butterfly valve actuated in a closing direction in said casing by the operation of the engine, means responsive to the difference of pressures inside and outside of the governor casing connected to said valve to augment the closing force acting thereon.

9. A governor for internal combustion engines having an intake passage, an unbalanced governing butterfly valve adapted to substantially close said passage, and vacuum responsive means for augmenting the movement of said valve toward closed position.

10. A governor for an internal combustion engine having an intake passage, a governing valve adapted to substantially close said passage and eccentrically pivoted to unbalance the same, and vacuum responsive means for augmenting the movement of said valve toward closed position.

JAMES W. ANDERSON.